United States Patent Office 3,678,004
Patented July 18, 1972

---

3,678,004
ACID-STABILIZED EPOXIDE RESIN COATING COMPOSITIONS AND METHOD OF PREPARING SAME
Raymond E. Meyers, Westchester, Ill., and Edgar W. Eubanks, Westview Village, Ohio, assignors to SCM Corporation, Cleveland, Ohio
No Drawing. Filed Jan. 7, 1970, Ser. No. 1,325
Int. Cl. C08g 30/10
U.S. Cl. 260—47 EC                 10 Claims

ABSTRACT OF THE DISCLOSURE

Disclosed are acid-stabilized epoxide resin coating compositions and processes for curing same. The compositions are one-component mixtures containing an epoxide resin, chelates of aluminum alcoholates as the curing or crosslinking agent and sufficient acid (e.g., at least about 0.1% by weight of the overall coating composition) to maintain low viscosity in the coating composition upon storage.

---

It is well known that epoxide resins which contain more than one epoxy group in its molecular strucutre can be converted by curing or chemical crosslinking into insoluble, infusible products which are well suited for protective and decorative coating applications for metals, ceramics, glass, plastics, wood, etc.; casting, molding and many other applications.

It has been suggested that alcoholates or alkoxides of polyvalent metals be used as curing agents for these epoxide resins. Epoxide compositions cured with such alcoholates are disclosed in U.S. Pat. 2,767,158, the disclosure of which is incorporated by reference. The present invention represents an improvement over this type of epoxide resin composition in that extended storage stability and longer pot-life are achieved in coating compositions containing epoxide resins and chelates of aluminum alcoholates as the crosslinking agents. The present composition finds particular utility for coating metallic containers and closures for containing food and other products because coating films produced therefrom are generally inert to food products, have excellent adhesion, chemical durability, color and film integrity. Furthermore, the one-component compositions are stable in that they resist crosslinking before application and can be prepared and packaged by the manufacturer at one location and shipped, stored and applied by the processor several months later. This presents a tremendous advantage to processors.

In the past, curing or crosslinking agents for epoxide resins have presented a serious disadvantage in that organic solutions of epoxide resins and curing agents exhibit a very short pot-life because they rapidly react in situ, in bulk before application to form a hard, crosslinked, gelled structure. As a result of this premature gelation, the resin becomes too thick for application by modern high-speed equipment and is therefore unsuitable for coating applications. Furthermore, such gelled epoxide resins often become discolored due to this premature curing and make it impossible to obtain coating films of very light color. These darkened coatings are unsightly and unacceptable in many applications. To overcome these disadvantages it has been necessary in the past to ship and store the epoxide component in one package and the curing agent in another package. This is quite inconvenient for both the coating manufacturer and the end user.

In accordance with the present invention, one-component epoxide resin compositions having excellent hardening properties as well as excellent shelf-life and bulk storage stability characteristics are achieved in a composition comprising an epoxide resin containing free epoxy groups in solution with a curing agent comprising a chelate of an aluminum alcoholate together with a sufficient amount of an acid (both organic and inorganic acids are suitable) to maintain the viscosity of said composition below about 60 seconds and preferably between about 25 to 50 seconds when viscosity is measured by a Number 4 Ford Viscosity Cup at 80° F. Optionally, the coating composition can contain conventional additives such as organic solvents, flow control and leveling agents, color stabilizers, pigments, fillers and so on. Bulk storage as used herein means storage in the container before application as a coating film.

The epoxide resin can be any organic epoxy resin resin having two or more reactable epoxy groups. The most common types are produced by the reaction of epoxide compounds (such as epihalohydrins) with polyhydric phenols to produce polyglycidyl ethers. Typical suitable resins of this type include diglycidyl ethers of bisphenol A (and its homologs); glycidyl ethers of glycerol; epoxylated novolac resins; glycidyl ethers of bisphenol F; and glycidyl ethers of long-chain bisphenol. Epoxide resins are commercially available under such tradenames as Araldite, sold by Ciba Company, Inc.; Epon, sold by Shell Chemical Company; EpiRez, sold by Jones-Dabney are suitable for the present purpose. Most of these commercial resins are derived by the reaction of polyhydroxy phenols (bisphenol A and bisphenol F) with epihalohydrins and particularly epichlorohydrin, having molecular weights in the range of 300–4,000 and epoxile equivalent weights in the range of 150–4,000. Other suitable epoxide resins of the type are disclosed in U.S. Pats. 2,467,171; 2,538,072; 2,581,464; 2,582,985; 2,615,007; and 2,698,-315, the disclosures of which are incorporated by reference.

Also suitable are the cyclic and acyclic aliphatic epoxy resins which do not contain the phenolic type structure associated with the more conventional epoxy resins. Typical base materials are vinylcyclohexenedioxide and dicyclopentadienedioxide. The acyclo types are smiilar to the cyclo epoxides except that their basic structural units are long chains, whereas the other resins have a ring structure. They can be broadly divided in to two main classes, epoxidized polyolefins and epoxidized oils. The epoxidized polyolefins can be prepared by oxidizing the polyolefin with "peracids" such as peracitic acid.

The present invention contemplates the utilization not only of the simple epoxy resins discussed above but also substituted epoxy resins of various structure including those which in addition to their oxirane groups contain other functional groups such as phenolic and hydroxyl groups. Such resins can be cured or crosslinked by utilization of the aluminum chelates described herein and the invention is applicable to epoxide resins of the most varied character. Furthermore, the surface films produced therefrom are high in gloss and have great hardness and chemical durability as well as unusual adhesion to metallic substrates.

As used herein the term "aluminum chelate" refers to the reaction product of an aluminum alcholate or alkoxide with tautomeric-reacting carbonyl compounds of the keto-enol structure. Thus, the aluminum chelates include the reaction products of aluminum alcoholates or alkoxides with ketocarboxylic acid esters such as acetoacetic ester, and β-diketones, such as acetylacetone and formyl compounds such as formyl acetone and formylacetophenone. Suitable aluminum alcoholates or alkoxides include the alcoholates of mono- or polyhydric alcohols of low or high molecular weight; such as, for example, ethanol, isopropanol, butanol, pentanol, propylene glycol, benzyl alcohol, cetyl alcohol, triethylene glycol and so on. Suitable aluminum alkoxides include the aluminum methyl oxide, aluminum ethyl oxide, aluminum butyl oxide, aluminum pentyl oxide, aluminum hexyl oxide, aluminum heptyl oxide, aluminum octyl oxide, aluminum dodecyl oxide, aluminum octadecyl oxide and the like.

Usually, the tautomeric-reacting carbonyl compounds employed have the keto-enol structure of the formula (in keto form):

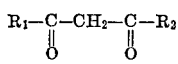

wherein $R_1$ represents hydrogen, alkyl (usually lower alkyl having 1–8 carbons such as methyl, ethyl, propyl, isopropyl, butyl and hexyl), aryl and alkoxy groups (usually lower alkoxy such as methoxy, ethoxy, isopropoxy and butoxy) and $R_2$ represents alkyl (usually lower alkyl), aryl and alkoxy (usually lower alkoxy) groups.

Compounds within the foregoing formula include hydroxy-ketones, keto-acids or their esters, hydroxyaldehydes and diketones (i.e., diones), acetoacetic esters, malonic acid esters of lower alcohols as methyl, ethyl, propyl and butyl alcohols, diacetone alcohol, 2,4-pentadione, acetylacetone and polymeric vinylmethyl-ketone. The preferred tautomeric compounds are the 1,3 dicarbonyl compounds in which one or both carbonyl groups can form a part of an ester linkage as in acetoacetate ester and malonic esters.

The aluminum chelate is formed by reacting the aluminum alcoholate or alkoxide with the tautomeric-reacting carbonyl compounds under suitable time/temperature reaction conditions as is known to those skilled in the art. For instance, a suitable aluminum chelate can be formed by refluxing one mol of aluminum alcoholate (e.g., aluminum butylate) with one mol of acetoacetic ester or acetylacetone or malonic acid esters or formylacetone and removing the volatile reaction products under vacuum. The molar proportion of reactants should be at least one-half mol of tautomeric compound per mol of aluminum alcoholate for product stability. Usually, the mol ratio is one mol of tautomeric compound per mol of aluminum alcoholate in the interest of efficiency and economy.

Such aluminum chelates and methods for their preparation are known to those skilled in the art and are disclosed in U.S. Pat. 2,767,158 and British Pats. 740,251; 740,576; and 759,013, the teachings of which are incorporated herein by reference. Suitable aluminum chelates are available commercially such as Harshaw Chemical's aluminum chelate PEA-1 (aluminum isopropylate wherein one isopropoxide group is replaced by ethyl acetoacetate) and aluminum chelate BEA-1 (aluminum secondary butoxide wherein one of the secondary butoxy groups has been replaced by ethyl acetoacetate).

The aluminum chelate can be incorporated into the epoxide resin either in a solvent system or solventless system. Where no solvent is employed, the admixture can be formed by reducing the viscosity of the epoxy resin by heat (if necessary) in the presence of the alcoholate. This method is not preferred because of the tendency for the alcoholate and the epoxide to crosslink during admixture. Whether or not a solvent is required depends upon the viscosity characteristic of the epoxide resin employed. When the epoxide resin is initially quite viscous or even solid, a solvent should be used necessarily to reduce the viscosity to the point where the resin is fluent (i.e., has a viscosity below about 60 seconds by the No. 4 Ford Viscosity Test). When solvents are used, they are usually used in the proportion of up to about 70% of the overall coating composition depending on the viscosity characteristic of the epoxide resin and aluminum chelate.

In the solvent method, the aluminum chelate can be dissolved in a suitable solvent and then added to the solvent diluted or undiluted epoxide resin together with the acid stabilizers, pigments, and so on, or all the components can be mixed simultaneously.

The weight ratio of epoxide resin to aluminum chelate in the coating composition is usually in the range of about 40:1 to about 5:1 and preferably about 25:1 to about 10:1 in the interest of economy and efficiency in cross-linking. Within these weight ratios the overall compositions of the epoxide resin aluminum chelate will depend upon the extent to which solvents, pigments and fillers are employed.

The acid stabilizers suitable for use in the present invention include any acid capable of contributing hydrogen ions (i.e., a proton doner) in the coating composition. The term "acid" has its conventional meaning herein (i.e., a chemical compound which yields hydrogen ions when dissolved in water; whose hydrogen can be replaced by metals or basic radicals; or which reacts with bases to form salts and water). Conventional inorganic or mineral acids such as hydrochloric, sulfuric, hydrobromic, phosphoric, nitric and so on are quite effective with hydrochloric, sulfuric and phosphoric being preferred for economic practicality. It has been found that these aqueous acids readily admix with the organic resin solutions to form a stable, one-phase, epoxide resin-aluminum chelate resin solution. Also suitable are the monobasic and polybasic organic acids such as citric, acetic, formic, adipic, fumaric, halogenated acetic, aryl sulfonic, maleic, lactic, tartaric and so on. The acid, whether organic or inorganic, should be used in an amount sufficient to maintain the viscosity of the resin solution below about 60 seconds by the Number 4 Ford Viscosity Cup. Usually, this requires at least about 0.05% by weight of the overall epoxide resin-aluminum chelate coating composition. In the interest of economic practicality, the acid concentration is usually about 0.1% to about 5% by weight of the overall coating composition.

The epoxide-aluminum chelate coating can be applied to the substrate by any conventional means including brushing, dipping, flowcoating, spray coating and roller coating. Once applied, the coating film can be cured or crosslinked by heating for a time sufficient to develop a hard, tough, chemically durable coating. Curing times and temperatures are well known and usually range from about 200° F. to about 500° F. for time periods of a few minutes to an hour and a half and longer with lower temperatures requiring longer time periods.

The invention will be more clearly understood from the following examples wherein all parts are parts by weight, all percentages are weight percentages, and all degrees are degrees Fahrenheit unless otherwise specified.

EXAMPLES 1–3

To demonstrate the principles of the present invention the following coating compositions were prepared. These coating compositions were prepared by thoroughly mixing the specified batch materials in a stirred reaction vessel at room temperature. The compositions are essentially organic solutions of epoxide resins containing aluminum chelates as the crosslinking agents. Various acid materials are employed to stabilize the compositions against premature gelation or crosslinking during storage before application. The coating compositions were all homogeneous one-phase mixtures. The compositions also contained conventional solvents such as aromatic and aliphatic hydrocarbon solvents and minor amounts of flow control and leveling agents to assist in the application of a uniform coating film.

The pH of the compositions were measured by standards pH electrodes. It is not known exactly what these pH measurements means in the essentially non-aqueous organic composition. Apparently, the pH measurements have some significance in that the coating compositions having better storage stability (i.e., the lower viscosities on storage) also tend to have lower measured pH values. Apparently, the acid is responsible for the lower viscosity and the pH electrodes somehow respond to the presence of acid in the organic coating composition.

The samples were stored at room temperature in sealed containers and the viscosity measurements were made using a No. 4 Ford Viscosity Cup at either 78° or 80° F. as indicated in the table. The Ford Viscosity Test utilizes a cup with a calibrated orifice in the bottom thereof. The cup is charged with a given quantity of the test liquid and the time for draining the test liquid through the orifice is measured in seconds. The longer time lengths indicate more viscous liquids.

The coating was cured for 10 minutes at 350° F. and then 10 minutes at 365° F. to form a clear, uniform, hard, chemically durable epoxy coating thereon. Other curing conditions such as 300–400° F. for 1–60 minutes can be employed. It will be understood by those skilled in the art that conventional time/temperature relationships for curing the epoxy can be employed.

The control composition was found to be too thick for conventional roller coating application and an unacceptable, irregular coating resulted.

TABLE I

|  | Example 1 | | Example 2 | | Example 3 | | Control | |
| --- | --- | --- | --- | --- | --- | --- | --- | --- |
|  | Parts | Percent | Parts | Percent | Parts | Percent | Parts | Percent |
| Composition: | | | | | | | | |
| Epoxy resin (Epotuf 38-503) sold by Reichold Chemicals, Inc., comprising a diglycidyl ether of bisphenol A having an epoxide equivalent weight of 1,500–2,000 in a 55% solution in cellosolve acetate) | 224.2 | 48.2 | 224.2 | 48.2 | 224.2 | 48.2 | 224.2 | 48.2 |
| Aluminum alcoholate chelate (aluminum chelate BEA-1, sold by Harshaw Chemical Company, comprising a derivative of aluminum secondary butoxide wherein one of the secondary butoxy group has been replaced by ethyl acetoacetate) | 12.5 | 2.7 | 12.5 | 2.7 | 12.7 | 2.7 | 12.5 | 2.7 |
| Acid stabilizers: | | | | | | | | |
| Phosphoric acid (15% solution in butanol of 85% $H_3PO_4$) | 8.5 | 1.8 | | | | | | |
| Hydrochloric acid (35% solution in water) | | | 0.9 | p.2 | | | | |
| Paratoluene sulfonic acid | | | | | 8.5 | 1.8 | | |
| Solvents: | | | | | | | | |
| Pentoxane (4-methoxy-4-methylpentanone-2) | 56.8 | 12.2 | 56.8 | 12.2 | 56.8 | 12.2 | 56.8 | 12.2 |
| Aromatic hydrocarbon solvent (Solvesso 100 having a distillation range of 310°–365° F.) | 85.7 | 18.7 | 85.7 | 18.7 | 85.7 | 18.7 | 85.7 | 18.7 |
| Aromatic hydrocarbon solvent (Panasol AN having a distillation range of 374°–495° F.) | 28.4 | 6.1 | 32.6 | 6.9 | 28.4 | 6.1 | 32.6 | 6.9 |
| Xylol | 40.0 | 8.8 | 44.7 | 9.6 | 40.9 | 8.8 | 45.1 | 9.8 |
| Leveling agents | 7.9 | 1.5 | 7.9 | 1.5 | 7.9 | 1.5 | 7.9 | 1.5 |
| Properties: | | | | | | | | |
| Initial Ford viscosity in seconds (No. 4 cup at 78° F.) | 25 | | 25 | | 25 | | 25 | |
| Ford viscosity in seconds after 3-month storage (No. 4 cup at 78° F.) | 59 | | 28 | | 45 | | 79 | |
| Ford viscosity in seconds after 4-month storage (No. 4 cup at 80° F.) | 57 | | 25 | | 45 | | 75 | |
| pH after 4-month storage | 8.7 | | 6.7 | | 8.5 | | 9.0 | |

The foregoing data indicates that the viscosity is lower (and therefore stability against premature gelation is improved) in Examples 1, 2 and 3 as compared to the control. The pH measurement, although made in a substantially organic medium, tends to support the observation that higher acidity results in lower viscosity.

By the way of comparison, water has a viscosity of about ten seconds when measured by the above described Ford Viscosity test. Desirable viscosities for coating applications are in the range of about 20 to 60 seconds by this viscosity test. Coating compositions having viscosities in excess of about 60 second tend to be too "thick" for convenient application and result in uneven, irregular coating films.

After four months' storage, the coating compositions prepared in Examples 1, 2 and 3 were applied as a protective coating to the exterior of a metal "screw-type" closure for a glass jar by a conventional roller coating technique.

EXAMPLE 4

Example 1 was repeated except that the aluminum chelate was a derivative of aluminum isopropoxide wherein one of the isopropoxide groups is replaced by ethyl acetoacetate rather than aluminum butoxide chelate of Example 1. Similar composition stability and coating results were obtained.

EXAMPLES 5–7

To further demonstrate the principles of the present invention the following coating compositions were prepared. Each coating composition had good storage stability and remained at a desirable viscosity (i.e., below about 60 seconds by the No. 4 Ford Viscosity test) for coating application when compared to the control which became quite viscous and unacceptable for coating application upon storage for a few months.

TABLE II

|  | Example 5 | | Example 6 | | Example 7 | | Control | |
| --- | --- | --- | --- | --- | --- | --- | --- | --- |
|  | Parts | Percent | Parts | Percent | Parts | Percent | Parts | Percent |
| Composition: | | | | | | | | |
| Epoxy resin: | | | | | | | | |
| Diglycidyl ether of bisphenol A resin having an epoxide equivalent of 1,600–2,000 and an average molecular weight of about 3,000 (Shell Chemical Company's Epon 1007) | 216 | 26.5 | 216 | 26.2 | | | 216 | 26.5 |
| Diglycidyl ether of bisphenol A resin having an epoxide equivalent weight of about 1,650–2,000 in a 50% solution in Cellosolve acetate (Ciba's Araldite Resin Solution) | | | | | 432 | 51.2 | | |
| Aluminum chelate: | | | | | | | | |
| Aluminum secondary butoxide having one butoxide group replaced by ethyl acetoacetate | 22 | 2.7 | 22 | 2.7 | 22 | 2.6 | 22 | 2.7 |
| Acid: | | | | | | | | |
| $H_3PO_4$ (85% solution in water) | 1 | 0.1 | | | | | | |
| $H_3PO_4$ (10% solution in butanol of 85% $H_3PO_4$) | | | 10 | 1.2 | 10 | 1.2 | | |
| Solvents: | | | | | | | | |
| Ethylene glycol monoethyl ether acetate | 216 | 26.5 | 216 | 26.2 | | | 216 | 26.5 |
| Xylol | 234 | 28.9 | 234 | 28.6 | 172 | 20.5 | 234 | 28.9 |
| Ethylene glycol monobutyl ether | 103 | 12.7 | 103 | 12.6 | | | 103 | 12.7 |
| Aromatic hydrocarbon solvent (Solvesso 100) | | | | | 100 | 11.9 | | |
| Pentoxane | | | | | 100 | 11.9 | | |
| Color depressant (triphenyl phosphite) | 21 | 2.6 | | 2.6 | | | 21 | 2.6 |
| Leveling agents | | | | | 8 | 1.0 | | |

Having thus described the invention, what is claimed is:

1. In an initially fluent, thermally curable coating composition comprising an epoxide resin having two or more oxirane groups and a chelate of an aluminum alcoholate crosslinkable with said epoxide resin, the improvement wherein said coating composition includes sufficient acid that is capable of contributing hydrogen ions to stabilize said coating composition against premature in situ gelation and maintain the viscosity of said composition below about 60 seconds when measured by a Number 4 Ford Viscosity Cup at 80° F. upon storage in bulk for at least about three months.

2. The coating composition of claim 1 wherein said acid is present in the proportion of at least about 0.05% by weight of said coating composition.

3. The coating composition of claim 2 wherein said aluminum chelate is the reaction product of an aluminum alcoholate and a tautomeric-reacting carbonyl compound of the formula

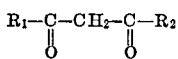

wherein $R_1$ represents hydrogen, alkyl, aryl and alkoxy groups and $R_2$ represents alkyl, aryl and alkoxy groups.

4. The coating composition of claim 3 wherein the weight ratio of epoxide resin to aluminum chelate in said composition is in the range of about 40:1 to about 5:1.

5. The coating composition of claim 3 wherein said acid is present in the proportion of about 0.1% to about 5% by weight of said coating composition and said composition further includes inert organic solvents.

6. The coating composition of claim 4 wherein said acid is a mineral acid.

7. The coating composition of claim 6 wherein said mineral acid is selected from the group consisting of hydrochloric, and phosphoric acids.

8. In the method for preparing an initially fluent, thermally curable coating composition wherein an epoxide resin having two or more oxirane groups is admixed with a chelate of an aluminum alcoholate crosslinkable with said epoxide resin, the improvement which comprises incorporating into said coating composition sufficient acid that is capable of contributing hydrogen ions to stabilize said coating composition against premature in situ gelation and maintain the viscosity of said composition below about 60 seconds when measured by a Number 4 Ford Viscosity Cup at 80° F. upon storage in bulk for at least about three months.

9. The method of claim 8 wherein said acid is incorporated in the proportion of at least about 0.05% by weight of said coating composition and said aluminum chelate comprises the reaction product of an aluminum alcoholate and a tautomeric-reacting carbonyl compound of the formula

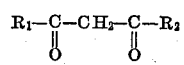

wherein $R_1$ represents hydrogen, alkyl, aryl and alkoxy groups and $R_2$ represents alkyl, aryl and alkoxy groups.

10. The method of claim 9 wherein the weight ratio of epoxide resin to aluminum chelate in said composition is in the range of about 40:1 to about 5:1.

References Cited

UNITED STATES PATENTS 2,767,158  10/1956  Schlenker et al. _____ 260—47
2,844,552   7/1958  Glaser _____ 260—2 X
2,686,771   8/1954  Whitehill et al. _____ 260—47

WILLIAM H. SHORT, Primary Examiner

T. E. PERTILLA, Assistant Examiner

U.S. Cl. X.R.

117—127; 161 ZB; 260—2 EC, 18 Ep, 31.4 Ep, 32.8 Ep, 33.2 Ep, 33.6 Ep, 37 Ep, 59